United States Patent [19]
McLafferty et al.

[11] Patent Number: 5,261,605
[45] Date of Patent: Nov. 16, 1993

[54] AXISYMMETRIC NOZZLE WITH GIMBLED UNISON RING

[75] Inventors: George H. McLafferty, North Palm Beach; Edward B. Thayer, Palm Beach Garden; Jim D. Stewart, Sebastian, all of Fla.

[73] Assignee: United Technologies Corporation, Hartford, Conn.

[21] Appl. No.: 873,485

[22] Filed: Apr. 22, 1992

Related U.S. Application Data

[63] Continuation of Ser. No. 571,948, Aug. 23, 1990, abandoned.

[51] Int. Cl.⁵ .................. B64C 15/02; F02K 1/12
[52] U.S. Cl. .................. 239/265.35; 239/265.33; 239/265.41
[58] Field of Search .............. 239/265.19, 265.33, 239/265.35, 265.37, 265.39, 265.41; 60/228, 230, 232

[56] References Cited

U.S. PATENT DOCUMENTS

| | | | |
|---|---|---|---|
| 2,846,844 | 8/1958 | O'Rourke | 239/265.35 X |
| 3,004,385 | 10/1961 | Spears, Jr. et al. | 239/265.41 |
| 3,792,815 | 2/1974 | Swavely et al. | 239/265.39 |
| 3,794,244 | 2/1974 | McMath et al. | 239/265.41 |
| 3,954,225 | 5/1976 | Camboulives et al. | 239/265.41 |
| 4,128,208 | 12/1978 | Ryan et al. | 239/265.39 |
| 4,176,792 | 12/1979 | McCardle, Jr. | 239/265.41 |
| 4,181,260 | 1/1980 | Nash | 239/265.39 |
| 4,245,787 | 1/1981 | Freid | 239/265.41 |
| 4,274,593 | 6/1981 | Joubert | 239/265.35 |
| 4,363,445 | 12/1982 | Bouiller et al. | 239/265.35 |
| 4,440,346 | 4/1984 | Wiley | 239/265.39 |
| 4,440,347 | 4/1984 | Madden et al. | 239/265.39 |
| 4,447,009 | 5/1984 | Wiley et al. | 239/265.39 |
| 4,456,178 | 6/1984 | Jones et al. | 239/265.39 |
| 4,994,660 | 2/1991 | Hauer | 239/265.41 |

Primary Examiner—Gregory L. Huson
Assistant Examiner—William Grant

[57] ABSTRACT

A thrust vectoring exhaust nozzle (10) includes a plurality of flaps (16-22) and seals (24-28) positioned by a unison ring (52) and flap links (54-60).

2 Claims, 2 Drawing Sheets

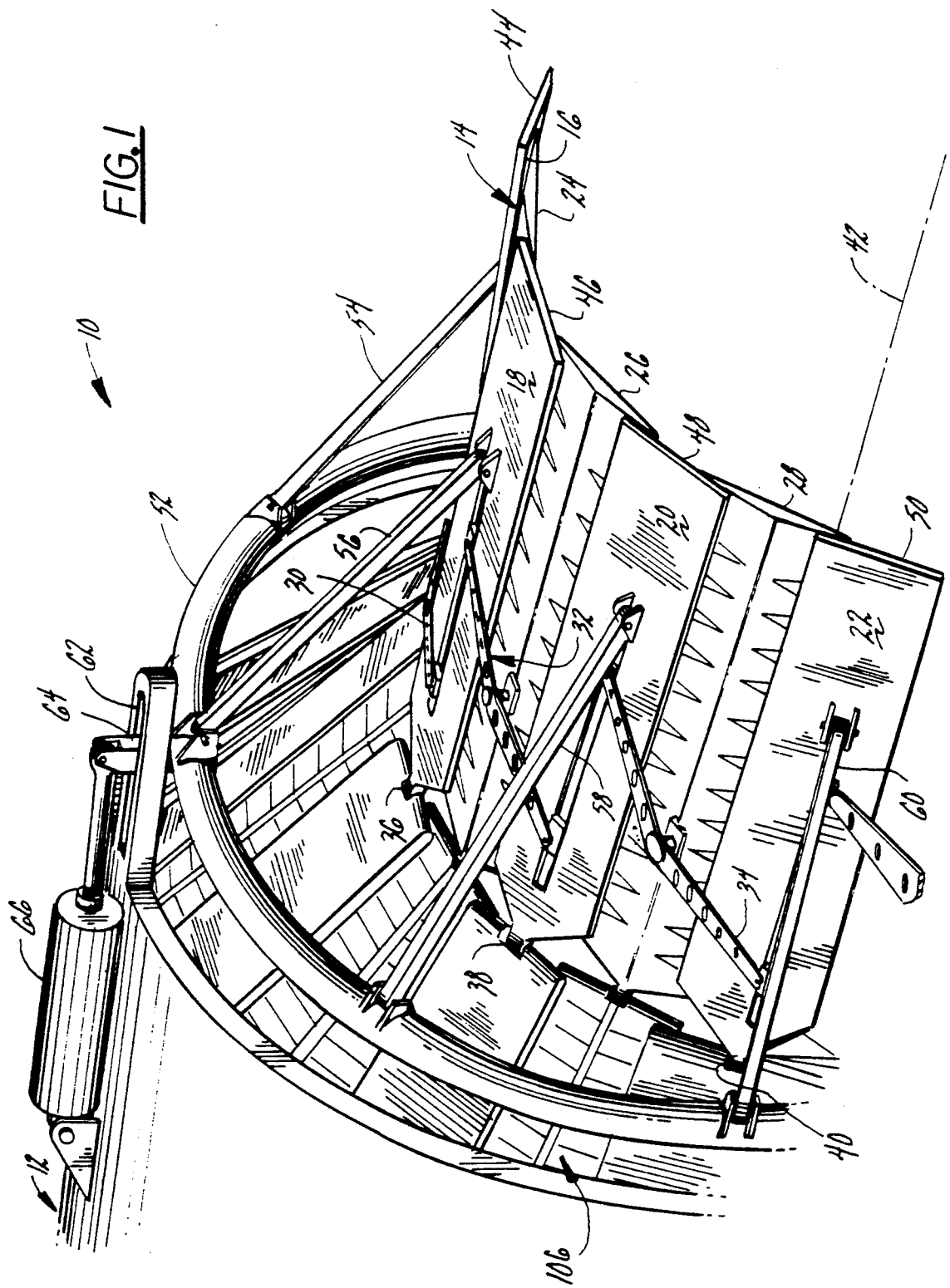

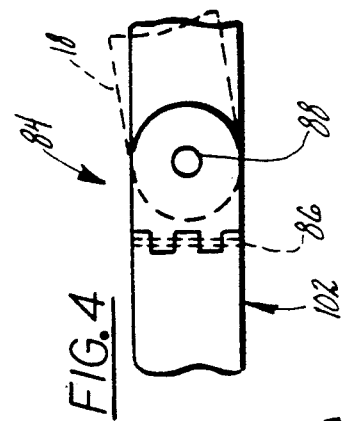
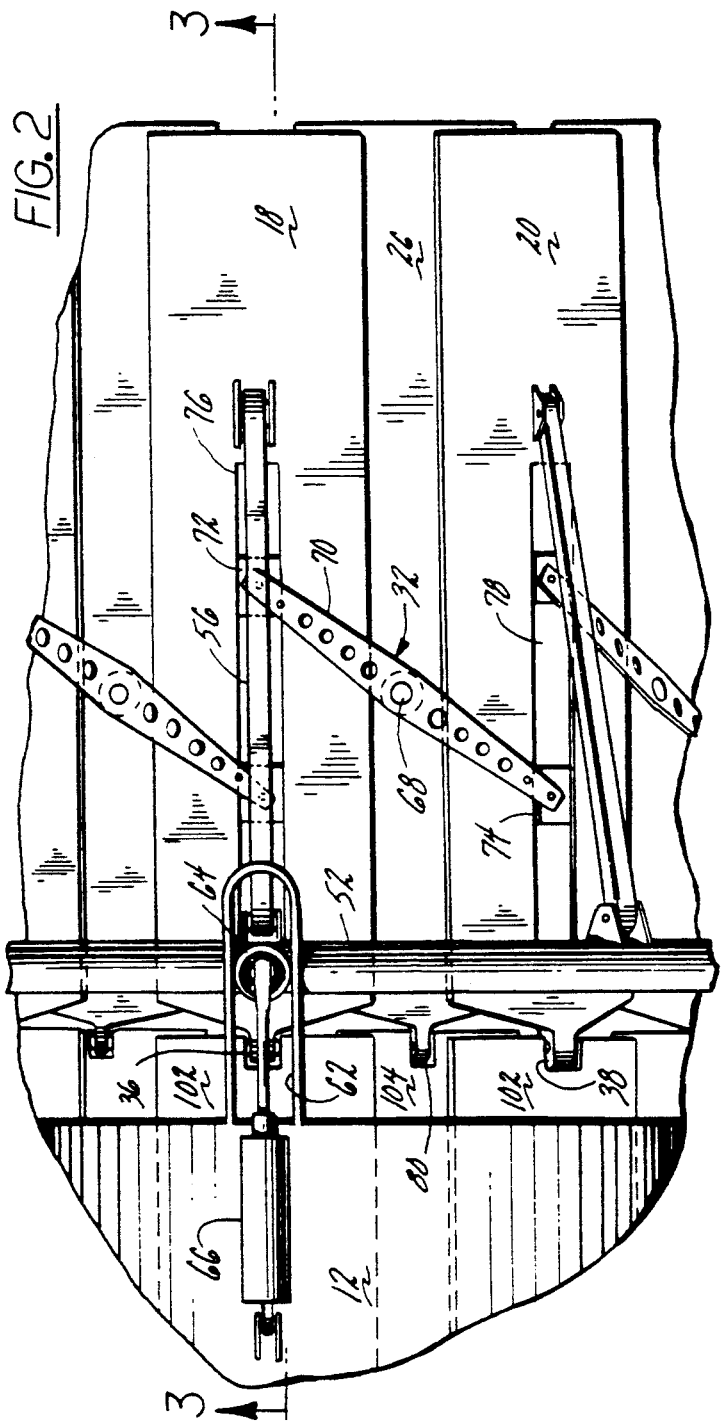

AXISYMMETRIC NOZZLE WITH GIMBLED UNISON RING

This is a continuation of U.S. Ser. No. 571,948 filed Aug. 23, 1990, now abandoned.

CROSS REFERENCE TO RELATED APPLICATIONS

Attention is hereby directed to copending application "Thrust Vectoring Exhaust Nozzle" (U.S. Ser. No. 571,797) filed on even date herewith, now U.S. Pat. 5,082,182.

FIELD OF THE INVENTION

The present invention relates to a thrust vectoring exhaust nozzle for an aircraft gas turbine engine.

BACKGROUND ART

Variable geometry exhaust ducts for aircraft gas turbine engine installations frequently employ an axisymmetric arrangement of overlapping flap and seal members to define the periphery of the exhaust duct. By providing an intermediate, transverse hinge in the flap and seal members, prior art ducts have achieved convergent-divergent arrangements wherein the duct may be configured to define a variable area throat which is necessary for optimized engine performance, particularly in high speed aircraft installations using afterburning for thrust augmentation.

Such prior art axisymmetric nozzles direct the exhaust gas aftward from the aircraft generally along a central axis. Certain alternative designs exist for attempting to provide a practical arrangement for selectively diverting the exhaust gas from this axial centerline in order to achieve vectored thrust for enhancing aircraft maneuverability. Such thrust vectoring nozzle configurations have typically not been adaptable to the axisymmetric nozzles described hereinabove and further are usually limited to redirecting exhaust gas in only a single plane. An additional drawback of prior art vectoring nozzle has been the increased weight of the actuators and exhaust gas directing surfaces at the aftmost portion of the exhaust duct and aircraft, thus adding additional weight at the most undesirable location in the aircraft due to stability and balance considerations.

What is needed is a thrust vectoring exhaust duct design which is adaptable to both convergent-divergent exhaust arrangements as well as lightweight, axisymmetric configurations.

SUMMARY OF THE INVENTION

The present invention provides a thrust vectoring, axisymmetric nozzle for selectively vectoring the discharge direction of a stream of exhaust gas from a gas turbine engine or the like. Such nozzles may be used in an aircraft to enhance maneuverability without increasing the size or losses resulting from typical aircraft control surfaces.

The invention comprises a plurality of longitudinally extending control flaps defining a moveable exhaust duct. Each flap is secured by a universal joint at the upstream end to a discharge throat and at a point downstream of the universal joint to one end of a positioning link. Each positioning link is secured at the other end to a moveable, coaxial unison ring whereby the entire control flap assembly can be collectively positioned.

The unison ring may be translated axially with respect to the engine centerline as well as tilted or skewed with respect thereto, thus causing the nozzle according to the present invention to collectively position the individual control flaps so as to vector the exhaust gas stream relative the nozzle central axis, or vary the nozzle discharge flow area as defined collectively by the plurality of flaps.

The nozzle according to the present invention provides the advantages of lightweight yaw and pitch thrust vectoring and a high degree of compatibility with current nozzle installations. The nozzle according to the present invention is also highly compatible with a variable throat area, convergent-divergent exhaust configuration, wherein the upstream end of each flap is secured to a corresponding moveable convergent flap member.

BRIEF DESCRIPTION OF THE DRAWINGS

FIG. 1 shows a perspective view of the exterior of a nozzle duct according to the present invention.

FIG. 2 shows a side elevation of the nozzle duct.

FIG. 3 shows a cross section of the upper flap assembly and linkage.

FIG. 4 shows an alternate flap universal joint arrangement.

DETAILED DESCRIPTION

Referring now to the drawing figures, and in particular to FIG. 1 thereof, a nozzle arrangement 10 according to the present invention may be viewed in perspective. The nozzle 10 includes a static upstream structure 12 integral with the airframe for supporting the outlet duct 14 according to the present invention.

The variable configuration outlet duct 14 includes a plurality of control flap members 16, 18, 20, 22 which collectively form the duct 14. In the FIG. 1 embodiment, a like plurality of seal members 24, 26, 28 are disposed circumferentially intermediate adjacent flap members and are maintained in a centered positioned therebetween by corresponding pivot links 30, 32, 34. Each control flap 16–22 is supported at the upstream end thereof by a universal joint 36, 38, 40 which permits the flap to pivot in the radial and circumferential planes with respect to the nozzle central axis 42. The trailing edges 44, 46, 48, 50 of the flaps 16–22 define the nozzle outlet from which high speed exhaust gases issue. The duct 14 may be reconfigured by collectively positioning the individual flap members 16–22 so as to selectively vector the discharge direction of the exhaust gases relative the nozzle central axis 42. This collective reconfiguration is accomplished by repositioning a unison ring 52 which is connected to each of the flap members 16–22 by flap links 54, 56, 58, 60.

Each flap link 54–60 is secured at each end by hinge joints so as to move the individual flap member 16–22 in the radial and circumferential plane about the corresponding upstream universal joint.

The unison ring 52 is supported relative to the static structure 12 by means of at least three cam races 62 which receive a corresponding number of rollers or pins 64 secured to the unison ring 52. The races 62, 64 prevent circumferential movement of the unison ring 52 while permitting portions of the ring to be moved axially by means of actuators 66 secured between the pin 64 and static structure 12.

As will be appreciated by viewing FIG. 1, the exhaust duct according to the present invention may be reconfigured in a variety of ways by translating the unison ring axially by means of the actuator 66. For example, the collective outlet area defined by the trailing edges 44-50 of the flap 16-22 may be varied by translating the entire unison ring 52 aftward, thereby collectively rotating the flaps radially inward. It will also be appreciated by those skilled in the art that the entire duct 14 may be skewed with respect to the fixed axis 42 by skewing the unison ring 52, that is by displacing portions of the circumference of the ring 52 at differing axial locations, thus, pitch and yaw vectoring, as well as combinations thereof, may be accomplished.

FIGS. 2 and 3 show plan and sectional views of the flap 18, cam race 62, and pin 64. Seal member 26 is shown disposed in FIG. 2 between flaps 18 and 20. The seal 26 is located between the flaps 18 and 20 by the pivot link 32 which includes a central pivot 68, a spanner link 70 and sliders 72, 74 which are engaged with corresponding tracks 76, 78 on the flaps 18, 20. The seal 26 is supported at the upstream end thereof by a universal joint 80 which is similar to the joints 36, 38 supporting the flaps 18, 20.

The side view of FIG. 3 shows the control flap 18, flap link 56, unison ring 52 and the other system components. The flap universal joint 36 is also shown as being sealed against leakage of gas by overlapping leaf seals 82.

For high performance jet aircraft it is common to employ a variable throat area, convergent-divergent exhaust duct wherein the divergent section, represented by the duct 14 according to the present invention, is disposed downstream of a convergent section which is operable to define a variable area throat which is coincident of the upstream end of the divergent duct 14. Prior art convergent ducts include a plurality of convergent flap members 102 and convergent seal members 104 alternatively disposed to collectively form the convergent duct 106 and means (not shown) for selectively positioning the convergent flap members and convergent seal members so as to define a variable area throat. Such convergent duct arrangements are well known in the art and will not be described in detail herein.

The divergent duct 14 according to the present invention, is well adapted to operate with such variable area convergent duct arrangements, with the upstream ends of the flaps 16-22 being secured to the downstream ends of the corresponding convergent flap members 102 by means of the universal joints 36-40 as described hereinabove. By properly positioning the unison ring 52 in conjunction with the movements of the convergent duct flaps, the duct 14 according to the present invention is well able to provide vectored thrust to the airframe under widely varying conditions of engine thrust, nozzle throat area, etc.

FIG. 4 shows an alternative universal joint design for supporting the upstream ends of the flap 16-22 wherein a double hinge arrangement is used. Shown in plan view, the joint 84 of FIG. 4 uses a first hinge 86 having a hinge line essentially tangential to the circumference of the duct 14 and a second hinge 88 having a hinge line oriented radially with respect to the duct 14. The first hinge 86 permits the flap 18 to rotate in a radial plane with respect to the nozzle centerline 42, while the second hinge 88 permits rotation of the flap 18 in the corresponding circumferential plane. The universal joint 84 as shown in FIG. 4 thus provides the degree of freedom necessary to accomplish the variable exhaust duct according to the present invention as well as offering the advantage of better sealing between the upstream structure 102 and the divergent control flaps 18 and seals of the duct 14 according to the present invention.

We claim:

1. An exhaust nozzle for selectively varying the direction of the discharge of a stream of exhaust gas comprising,
    an exhaust duct having an upstream entry end and a downstream discharge end, including
    a plurality of flaps defining the perimeter of the exhaust duct, each flap disposed adjacent to other flaps and extending from the entry end to the discharge end, each flap secured at the upstream end thereof to a supporting universal joint,
    means, disposed between an adjacent upstream static structure and each flap, for selectively positioning said flap relative to the corresponding universal joint, wherein the positioning means further includes,
    a unison ring, disposed generally coaxially with respect to the exhaust duct, a plurality of elongated links, each link secured at one end thereof to the unison ring, and at the other end thereof to one of the flaps, and
    means for axially positioning and orienting the ring,
    wherein the unison ring is supported by first and second pairs of axially extending cam races, each pair of races located on one of two orthogonal transverse axes with respect to the exhaust stream,
    wherein the unison ring includes four equally circumferentially spaced pins, each pin received within a corresponding cam race, and
    wherein the positioning means includes a plurality of actuators disposed between the static structure and the ring.

2. The nozzle as recited in claim 1, further comprising,
    a plurality of seals, each seal disposed between two adjacent flaps and slidably engaged with a planar surface of each flap, and
    means, disposed between adjacent flaps for maintaining the seal disposed therebetween in a substantially centered orientation.

* * * * *